United States Patent [19]
Villard

[11] Patent Number: 6,017,103
[45] Date of Patent: Jan. 25, 2000

[54] TRACK SHOE

[75] Inventor: Jean F. Villard, Cras, France

[73] Assignee: Caterpillar Inc., Peoria, Ill.

[21] Appl. No.: 09/109,208

[22] Filed: Jun. 30, 1998

[51] Int. Cl.[7] .................................................. B62D 55/26
[52] U.S. Cl. ......................... 305/192; 305/178; 305/161
[58] Field of Search ................................... 305/191, 192, 305/194, 160, 161, 180, 178, 179; 301/43; 404/121

[56]  References Cited

U.S. PATENT DOCUMENTS

| | | | |
|---|---|---|---|
| 2,549,930 | 4/1951 | Riegel et al. | 219/635 |
| 3,286,379 | 11/1966 | Benetti | 37/452 |
| 3,372,959 | 3/1968 | Watts, Jr. | 305/191 |
| 3,790,353 | 2/1974 | Jackson et al. | 75/236 |
| 3,912,338 | 10/1975 | Toews | 305/191 |
| 3,972,570 | 8/1976 | Massieon | 305/191 |
| 4,021,082 | 5/1977 | Rasmussen | 305/192 |
| 4,187,626 | 2/1980 | Greer et al. | 37/141 R |
| 5,111,600 | 5/1992 | Lukavich et al. | 37/141 T |

OTHER PUBLICATIONS

Sales brochure, "The Hard Facts about Cat Abrasion Resistant Material" for Caterpillar Ground Engaging Tools—Publication No. PEDP4030—1994.

*Primary Examiner*—D. Glenn Dayoan
*Assistant Examiner*—Long Bao Nguyen
*Attorney, Agent, or Firm*—William C. Perry; Byron G. Buck

[57]  ABSTRACT

In the operation of a track type machine in highly abrasive material, premature wear of the track shoes has been a common occurrence. The present invention provides a track shoe that has a grouser that defines a plurality of grooves that extend in a direction that is substantially the same as that of the grouser. The grooves are formed on both the leading and trailing sides of the grouser and are filled with an abrasion resistant material. The grooves are arranged such that the strips of abrasion resistant material on the first side are aligned with the spaces between the strips on the opposite side and vice versa.

12 Claims, 1 Drawing Sheet

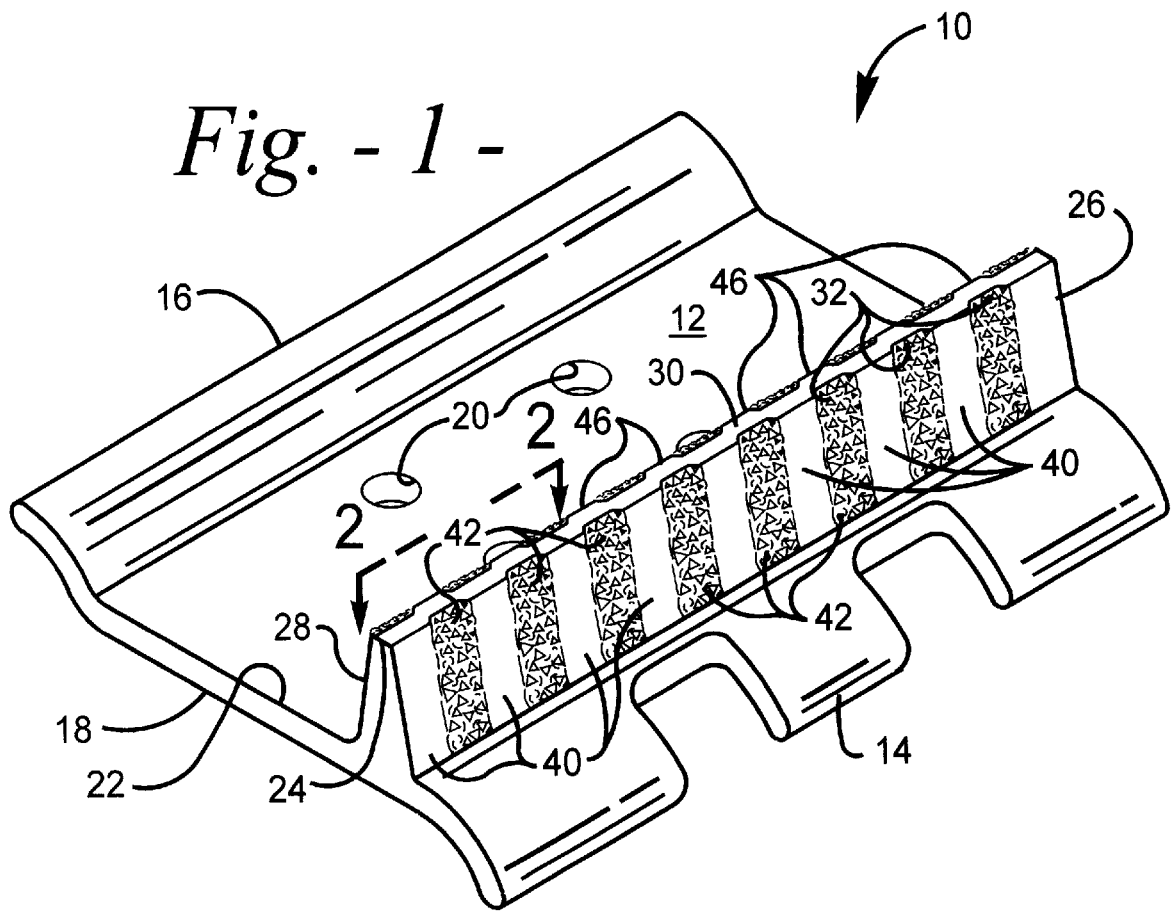
Fig. - 1 -
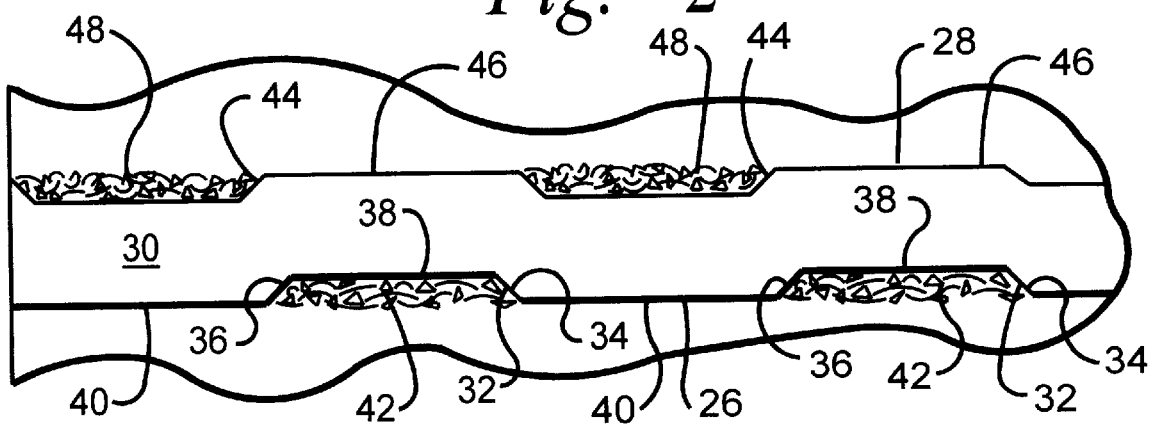
Fig. - 2 -

TRACK SHOE

TECHNICAL FIELD

This invention relates to a track shoe design for a track-type machine and more particularly to a track shoe that includes the use of abrasion resistant material to extend the life of the track shoe when the machine is operated in areas prone to high wear.

BACKGROUND ART

In the operation of track type machines, it is common to encounter terrain of varying types. Some types of terrain are relatively soft and will not cause much wear of the components of the track assembly, while others are highly abrasive and cause accelerated wear of the components. In terrain that is extremely rocky, for instance, the track shoes are known to wear at an exceptionally rapid rate. In particular, the grouser area of the track shoe, or the portion of the shoe that contacts the rocks, is especially susceptible to premature wear.

In other components, such as ground engaging tools and compactor teeth, that typically encounter operation in highly abrasive terrain, it is common to apply strips of abrasion resistance material to strategic areas of the component to extend the wear life. This material is commonly known as A. R. M. (Abrasion Resistant Material). While this material has been known to be highly effective in abrasive material, it has not been quite as successful in areas of high impact, such as rocky conditions. One difficulty encountered with A.R.M. in high impact areas is the tendency for the strip of A.R.M. to lose its bond with the metal component, thus reducing its term of effectiveness.

The present invention is directed to overcoming one or more of the problems set forth above.

DISCLOSURE OF THE INVENTION

In one aspect of the present invention, a track shoe is provided that has a base portion and a grouser member that is defined on the base portion. The grouser member is positioned to extend from the base portion in a direction that is substantially normal to the base portion. A first plurality of strips of abrasion resistant material is positioned along a first face defined by the grouser which extends substantially along the entire width of the base portion. The first plurality of strips is positioned in spaced relation to one another and extends in a direction that is substantially normal to the base portion.

In another aspect of the present invention, a track assembly is provided that includes a plurality of track chains that are formed by a plurality of track links that are pinned together in spaced relation to one another. The track assembly is improved by providing a track shoe that has a base portion that has a first and second side. The track shoes are mounted to the track assembly with the first sides thereof in engagement with the respective spaced apart track links. A grouser member is defined on the second side of the base portion to extend in a direction that is substantially normal to the base portion. The grouser member extends along substantially the entire width of the base portion and defines a contact surface on a terminal end thereof. The contact surface extends in a direction that is substantially parallel to the base portion. A plurality of strips of abrasion resistant material is positioned to extend between the contact surface and the base portion. The strips are spaced from one another along the entire width of the track shoe.

With track shoes as set forth above, a track-type machine may operate in an area of extremely high impact and not be prone to premature wear. The abrasion resistant strips are positioned to intersect the contact surface defined by the grouser at spaced intervals. Being so positioned, the strips provide the contact surface with a plurality of wear resistant "points" of contact that prevent the grouser from being worn down prematurely. Also, since the entire strip of abrasion resistant material is not engaged with the terrain under high impact conditions at the same time, the strips are not prone to premature removal.

BRIEF DESCRIPTION OF THE DRAWINGS

FIG. 1 is a diagrammatic isometric view of a track shoe that embodies the principles of the present invention; and FIG. 2 is a diagrammatic top view of a portion of the grouser member defined by the track shoe shown in FIG. 1.

BEST MODE FOR CARRYING OUT THE INVENTION

Referring now to the drawings, a track shoe, generally shown at 10 is disclosed. The track shoe is one of a plurality of shoes intended for use with a typical track type machine that is powered by a pair of track assemblies (not shown). Each track assembly includes a pair of track chains comprised of a plurality of track links that are pinned together and spaced in parallel relation to one another.

The track shoe 10 of the illustrated embodiment includes a substantially planar base portion 12 that defines leading and trailing edges 14 and 16 respectively. The track shoe defines a first side 18 that engages each of the adjacently spaced track links of the track assembly. Continuous engagement between the track links and the first side 18 of the track shoe is maintained by a plurality of track bolts (not shown). The track bolts extend through a plurality of holes 20 formed in the base portion 12, and are threadably received in the track links in a well known manner.

The track shoe 10 further defines a second side 22 that faces outwardly from the track assembly and is adapted to engage the ground during movement of the machine. A grouser member 24 is defined on the second side of the base portion 12 and extends in a direction that is substantially normal to the orientation of the base member 12, which is shown to be upwardly therefrom as viewed in FIG. 1. The grouser member defines a first face 26 that is positioned on the side of the leading edge 14 and a second face 28 that is positioned on the opposite side, or on the side of the trailing edge 16. The grouser member defines a contact surface 30 on an terminal end thereof that extends substantially parallel to the base portion 12 and extends substantially along the entire width of the base portion.

A plurality of grooves 32 are positioned along the first face 26 of the grouser 24 and extend between the contact surface 30 and the base of the grouser, or point of intersection with the base portion 12. The grooves 32 each have angled side surfaces 34 and 36 that extend from the first face 26 of the grouser to join a base surface 38 that is substantially parallel to the first face 26. The grooves are spaced evenly along the first face and all are shown to extend substantially normal to the base portion 12. In the illustrated embodiment, there are eight grooves defined in the first face of the grouser, each groove being separated by a space 40. Each groove 32 is adapted to receive a strip 42 of abrasion resistant material. While any number of types of abrasion resistant material may be used, the present embodiment is intended to use the abrasion resistant material of the type known as A.R.M. This particular type of abrasion resistant material is a coating made of extremely hard tungsten carbide particles. The strip 42 of A.R.M. is placed in the grooves by a special welding process that allows the strip of A.R.M. to bond itself to the angle side surfaces 34 and 36 and base surfaces 38 of the grooves 32.

The second face 28 of the grouser 24 also defines a plurality of grooves 44 that are positioned to extend along the width of the base portion 12, separated by spaces 46. The grooves 44 are substantially identical to the grooves 32 defined on the first face 26 in all aspects except their positioning. Like the grooves 32, the grooves 44 are adapted to receive strips 48 of abrasion resistant material. The grooves 44 on the second face are positioned to intersect the contact surface 30 in opposition to a space 40 that is between the grooves 32 on the first face 26. In other words, the strips 42 and 48 the first and second faces 26 and 28 respectively, do not align with each other in a fore and aft direction when viewing the drawing. Instead, they are in offset alignment from one another. In the illustrated embodiment, there are nine grooves 44 defined on the second face 28 of the grouser. The points of intersection of each of the strips of abrasion resistant material with the contact surface 30 of the grouser are evenly spaced therealong to insure even wear of the contact surface. It is to be understood that while the number of grooves and strips of abrasion resistant material defined on the first and second faces 26 and 28 number nine and eight respectively, other numbers of grooves on the respective faces may also be used without departing from the present invention.

INDUSTRIAL APPLICABILITY

During the operation of a track type machine, areas of varying terrain are often encountered. In some instances, very rocky terrain may be encountered that creates high abrasion and, in some instances, high impact loading on the grousers of the track shoes. In these instances, the contact surface 30 has areas of abrasion resistant material spaced evenly along the length thereof. These areas are more abrasion resistant than the parent material that comprises the track shoe including the grouser. Therefore wear of the grouser is extended. Also, in areas of high impact, the orientation of the strips of abrasion resistant material 42 and 48 is such that only a point of each strip is in contact with the ground. Since the entire strip is not in contact with the impacting material, it is not prone to premature removal.

Other aspects, objects and advantages of this invention can be obtained from a study of the drawings, the disclosure and the appended claims.

I claim:

1. A track shoe, comprising:

a base portion having a width and a length;

a grouser member having a first face and a second face disposed on the base portion and being positioned to extend from the base portion in a direction that is substantially normal to the base portion along substantially the entire width thereof;

a first plurality of strips of abrasion resistant material defined along the first face of of the grouser member to extend substantially along the entire width of the base portion, said first plurality of strips being positioned in spaced relation to one another and extending in a direction that is substantially normal to the base portion.

2. The track shoe as set forth in claim 1 wherein a second plurality of strips of abrasion resistant material is disposed along the second face of the grouser member that extends substantially along the entire width of the base portion, said second plurality of strips being positioned in spaced relation to one another along the second face in a direction that is substantially normal to the base plate.

3. The track shoe as set forth in claim 2 wherein the second plurality of strips is positioned along the grouser member in a manner wherein they are offset from alignment with the first plurality of strips.

4. The track shoe as set forth in claim 1 wherein a plurality of grooves are disposed in the first face of the grouser member, each groove being adapted to receive one of the first strips of abrasion resistance material.

5. The track shoe as set forth in claim 2 wherein a plurality of grooves are disposed in the second face of the grouser member, each groove being adapted to receive one of the second strips of abrasion resistance material.

6. The track shoe as set forth in claim 2 wherein the number of the first plurality of strips equals eight and the number of the second plurality of strips equals nine.

7. In a track assembly having a plurality of track chains formed by a plurality of track links pinned together in spaced, parallel relation to one another, the improvement comprising:

a track shoe having a base portion having first and second sides and a width and a length, said track shoe being mounted to the track assembly with the first side thereof in engagement with the respective spaced apart track links;

a grouser member disposed on the second side of the base portion to extend in a direction that is substantially normal to the base portion along substantially the entire width thereof to define a contact surface on a terminal end thereof that is substantially parallel to the base portion;

a plurality of strips of abrasion resistant material extending between the contact surface and the base portion, said strips being spaced from one another along the entire width of track shoe.

8. The improvement as set forth in claim 7 wherein the grouser member defines first and second surfaces thereon, said plurality of strips being positioned on the first surface.

9. The improvement as set forth in claim 8 wherein a second plurality of strips of abrasion resistant material is positioned to extend between the contact surface and the base portion in spaced relation to one another along the entire width of the track shoe, said second plurality of strips being positioned on the second surface of the grouser member.

10. The improvement as set forth in claim 9 wherein there is an even number of strips of abrasion resistant material on the first surface of the grouser member and an odd number of strips of abrasion resistant material on the second surface of the grouser member.

11. The improvement as set forth in claim 9 wherein the first plurality of strips are positioned along the first surface of the grouser member having spaces of predetermined width positioned therebetween and the second plurality of strips is positioned along the second surface of the grouser member having spaces of predetermined width positioned therebetween, said second plurality of strips being aligned with the spaces positioned between the first plurality of strips and in offset relation to the first plurality of strips.

12. The improvement as set forth in claim 9 wherein each of the strips of abrasion resistant material is positioned within a groove that is defined in the first and second surfaces of the grouser member, said groove having a base portion that is substantially planar.

* * * * *